Patented Feb. 12, 1946

2,394,644

UNITED STATES PATENT OFFICE 2,394,644

PRODUCTION OF ALPHA-CHLORO, BETA-HYDROXYNITRILES

Karl Heinrich Walter Tuerck, Banstead, and Hans Joachim Lichtenstein, London, England, assignors to The Distillers Company Limited, Edinburgh, Scotland, a company of Great Britain No Drawing. Application January 24, 1944, Serial No. 519,540. In Great Britain February 15, 1943

5 Claims. (Cl. 260—464)

This invention relates to the production of alpha-chloro-beta-hydroxy nitriles from the corresponding alpha-beta-unsaturated nitriles, and relates especially to the preparation of alpha-chloro-beta-hydroxypropionitrile and alpha-chloro-beta-hydroxybutyronitrile.

It has already been suggested in United States Patent No. 2,231,360 to prepare a mixture of alpha-beta-dichloro-propionitrile and alpha-chloro-beta-hydroxypropionitrile by reacting chlorine with acrylonitrile in an aqueous medium. This specification, however, discloses the reaction of chlorine only with an aqueous suspension or emulsion of acrylonitrile at temperatures of approximately 25–50° C. The yields of alpha-chloro-beta-hydroxypropionitrile obtained by this process are, however, low, varying from 9 to 20% whilst the alpha-beta-dichloro-propionitrile is obtained in considerably larger yields.

According to the present invention, an aqueous solution of an alpha-beta-unsaturated nitrile is reacted with chlorine or hypochlorous acid at a temperature between 0° C. and 20° C. whilst the concentration of said nitrile in the solvent is maintained at or below the solubility value at the reaction temperature whereby the whole of said nitrile remains in solution throughout the period of the reaction. Preferably the reaction temperature is maintained at 16° C. to 20° C.

We have found that, with this process, alpha-chloro-beta-hydroxy nitriles can be obtained in high yield and as the main product of reaction. Thus if chlorine is passed into a solution of acrylonitrile in water at a temperature between 0° C. and 20° C., the acrylonitrile can be converted almost quantitatively into alpha-chloro-beta-hydroxypropionitrile, with the simultaneous production of practically no alpha-beta-dichloro-propionitrile.

Instead of using water only as the solvent, it is possible to use mixtures of water and water-soluble alcohols or ketones, e. g., acetone; we prefer, however, to use solutions which contain more than 50% of water.

The hydrochloric acid set free during the reaction does not adversely affect the yield of the alpha-chloro-beta-hydroxy nitriles obtained. This fact is somewhat surprising in view of the fact that it is well known that nitriles can be saponified to carboxylic acids by means of mineral acids.

The free acid may, however, if desired, be neutralised periodically or continuously by means of neutralising agents, e. g., alkali or alkaline earth metal hydroxides, carbonates, or salts of weak acids. An excess of calcium carbonate may, for example, be added at or near the commencement of the reaction. Excess of alkalies should, however, be avoided. Neutralisation by this means has the advantage of preventing the attack of free hydrochloric acid on the walls of the reaction vessel employed. It also renders easier the solvent extraction of the alpha-chloro-beta-hydroxy nitriles from the reaction mixture. Suitable solvents for this purpose are ether and ethyl acetate, or water-immiscible alcohols.

Care should be taken to ensure that the aqueous solution of the nitrile to be treated with chlorine, does not have an alkaline reaction.

If desired, fresh alpha-beta-unsaturated nitrile may be added continuously or intermittently during the course of the reaction, so long as its limit of solubility is not, at any time during the reaction, exceeded.

The following examples illustrate the manner in which the invention may be carried into effect, quantities being stated in parts by weight.

*Example I.*—33 parts of acrylonitrile were dissolved in 700 parts of water and chlorine passed into the solution for 23 hours. The temperature of the solution was maintained at 18° C. The solution was extracted twice with ether, and 55 parts of crude product were obtained after distillation of the ether. This was distilled without fractionation under reduced pressure and gave 43 parts of a fraction boiling at 92–93° C./3 mm. mercury pressure, the remaining 12 parts consisting of unchanged acrylonitrile. The fraction was found, on analysis, to contain Cl 35.8%. (Theoretical for alpha-chloro-beta-hydroxypropionitrile 33.7%, and for alpha-beta-dichloropropionitrile 57.0%).

*Example II.*—128 parts of acrylonitrile were dissolved in 2000 parts of water at 16° C. and chlorine passed into the solution at a rate slightly in excess of that at which it was absorbed. The solution was agitated continuously throughout the reaction. When the rate of chlorine absorption had diminished, after 24 hours, a further 64 parts of acrylonitrile were introduced and the reaction continued for a further 29 hours. Excess of chlorine was then destroyed by the addition of the calculated quantity of sodium bisulphite and the alpha-chloro-beta-hydroxypropionitrile extracted from the solution by two extractions with ethyl acetate. On distilling the extract, after removal of the solvent, 225 parts of alpha-chloro-beta-hydroxypropionitrile were obtained at 100–110° C./10 mm. with about 20 parts of residue.

Unchanged acrylonitrile was not determined and was distilled off with the ethyl acetate. No alpha-beta-dichloropropionitrile was detected (it has a boiling point of 80° C./10 mm.) and the amount of acrylonitrile lost due to hydrolysis to ammonium acrylate was about 4.0 gms. The chlorine content of the fraction boiling at 100–110° C./10 mm. was 35.1%.

*Example III.*—A similar experiment was carried out using 80 parts of crotonitrile dissolved in 1200 parts of water the temperature being maintained at 16° C. Apart from unchanged crotonitrile, the sole product of the reaction was alpha-chloro-beta-hydroxy-butyronitrile, B. P. 126° C./85 mm. Its chlorine content was 30.6% (theoretical 29.6%; and for alpha-beta-dichlorobutyronitrile 46.2%).

What we claim is:

1. A process for the manufacture of alpha-chloro-beta-hydroxy propionitrile by the action of gaseous chlorine upon acrylo-nitrile in the presence of water at a temperature between 0° C. and 20° C. characterised by the step of substantially completely suppressing the formation of alpha-beta-di-chloro-propionitrile consisting in maintaining said acrylo-nitrile completely dissolved in the reaction mixture and terminating the reaction before complete conversion thereof has occurred.

2. A process for the manufacture of alpha-chloro-beta-hydroxy propionitrile, whilst substantially completely suppressing the formation of alpha-beta-dichloropropionitrile, which comprises introducing gaseous chlorine into an aqueous solution of acrylonitrile maintained at a temperature between 0° C. and 20° C. and at a concentration not exceeding the solubility value thereof and terminating the reaction whilst a substantial amount of acrylonitrile still remains unconverted.

3. A process for the manufacture of alpha-chloro-beta-hydroxy propionitrile, whilst substantially completely suppressing the formation of alpha-beta-dichloropropionitrile, which comprises introducing gaseous chlorine into a solution of acrylonitrile in a mixture of water and a water-miscible solvent maintained at a temperature between 0° C. and 20° C. and at a concentration not exceeding the solubility value thereof and terminating the reaction whilst a substantial amount of acrylonitrile still remains unconverted.

4. A process for the manufacture of alpha-chloro-beta-hydroxy propionitrile, whilst substantially completely suppressing the formation of alpha-beta-dichloropropionitrile, which comprises introducing gaseous chlorine into an aqueous solution of acrylonitrile maintained at a temperature between 16° and 20° C. and at a concentration not exceeding the solubility value thereof and terminating the reaction whilst a substantial amount of acrylonitrile still remains unconverted.

5. A process for the manufacture of alpha-chloro-beta-hydroxy propionitrile, whilst substantially completely suppressing the formation of alpha-beta-dichloropropionitrile, which comprises introducing gaseous chlorine into an aqueous solution of acrylonitrile maintained at a temperature between 0° C. and 20° C. and at a concentration not exceeding the solubility value thereof terminating the reaction whilst a substantial amount of acrylonitrile still remains unconverted and extracting the alpha-chloro-beta-hydroxy propionitrile and unchanged acrylonitrile from the hydrochloric acid-containing reaction mixture by means of a water-immiscible solvent.

KARL HEINRICH WALTER TUERCK.
HANS JOACHIM LICHTENSTEIN.